United States Patent
Niarfeix

(10) Patent No.: US 9,746,026 B2
(45) Date of Patent: Aug. 29, 2017

(54) SELF ADJUSTING INSTRUMENTED BEARING AND MECHANICAL SYSTEM EQUIPPED WITH SUCH A BEARING

(71) Applicant: Francois Niarfeix, Saint-Cyr (FR)

(72) Inventor: Francois Niarfeix, Saint-Cyr (FR)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 15/138,496

(22) Filed: Apr. 26, 2016

(65) Prior Publication Data

US 2016/0319863 A1    Nov. 3, 2016

(30) Foreign Application Priority Data

Apr. 29, 2015   (FR) ..................... 15 53879

(51) Int. Cl.
| | |
|---|---|
| F16C 23/08 | (2006.01) |
| F16C 41/00 | (2006.01) |
| F16C 19/18 | (2006.01) |
| F16C 19/38 | (2006.01) |

(52) U.S. Cl.
CPC ............ *F16C 23/082* (2013.01); *F16C 19/18* (2013.01); *F16C 23/086* (2013.01); *F16C 41/007* (2013.01); *F16C 19/183* (2013.01); *F16C 19/38* (2013.01)

(58) Field of Classification Search
CPC ...... F16C 23/082; F16C 19/18; F16C 23/086; F16C 41/007
See application file for complete search history.

(56) References Cited

U.S. PATENT DOCUMENTS

| | | | | |
|---|---|---|---|---|
| 4,348,665 | A * | 9/1982 | Rode ................... | F16C 19/52 164/153 |
| 5,764,049 | A * | 6/1998 | Hofmann ............ | B60B 27/0005 324/173 |
| 8,840,311 | B2 * | 9/2014 | Landrieve ............ | F16C 23/084 384/448 |
| 2014/0079350 | A1 * | 3/2014 | Rink ..................... | F16C 23/086 384/497 |
| 2016/0319862 | A1 * | 11/2016 | Niarfeix ................ | F16C 19/18 |

FOREIGN PATENT DOCUMENTS

| | | |
|---|---|---|
| EP | 137270 A2 | 4/1985 |
| WO | 9630769 A1 | 10/1996 |
| WO | 2010064088 A | 6/2010 |

\* cited by examiner

*Primary Examiner* — Thomas R. Hannon
(74) *Attorney, Agent, or Firm* — Bryan Peckjian; SKF USA Inc. Patent Dept.

(57) ABSTRACT

A self adjusting instrumented rolling bearing having an outer ring and an inner ring delimiting a rolling chamber and at least one row of rolling elements disposed therein, and a detection device including a sensor integral with the outer ring and a target integral with the inner ring, configured to detect a relative rotation between the outer ring and the inner ring around a central axis. The outer ring has an inner surface in the form of a spherical portion centered about a tilting center of the bearing and forming a rolling surface for the rolling elements. The radius of the inner surface of the outer ring is greater than a distance defined between the tilting center of the bearing and a specific position of the target that is the farthest from the tilting center.

7 Claims, 3 Drawing Sheets

United States Patent US 9,746,026 B2

SELF ADJUSTING INSTRUMENTED BEARING AND MECHANICAL SYSTEM EQUIPPED WITH SUCH A BEARING

CROSS-REFERENCE TO RELATED APPLICATION

This application claims priority to French patent application no. 1553879 filed on Apr. 29, 2015, the contents of which are fully incorporated herein by reference.

FIELD OF THE INVENTION

The present invention relates to a self-adjusting instrumented bearing. The invention also relates to a mechanical system provided with such a bearing.

BACKGROUND OF THE INVENTION

In known manner, a mechanical system may be equipped with a support, a shaft, and a bearing interposed between the support and the shaft for supporting and guiding the latter in rotation. The bearing may be formed by a radial contact bearing, comprising a fixed ring disposed in a housing of the support and a movable ring integral with the shaft. However, such a bearing is not optimized for certain applications, for example in a gearbox and/or in case of heavy loads. In this case, one uses a spherical bearing formed by a self-adjusting bearing, in which a ring is fixed while the other ring is tiltable. Such a bearing is used to compensate for any misalignment between the shaft axis and the axis of the housing formed in the support.

Furthermore, it is known to provide a mechanical system with an instrumented bearing for controlling its operating parameters, such as the speed of rotation of the shaft. Such a bearing usually comprises a sensor integral with the fixed ring and a target integral with the mobile ring, forming a relative rotation detection device between the rings.

WO-A-2010 064 088 describes an example of instrumented bearing. The bearing comprises an outer ring and an inner ring delimiting a rolling chamber in which is disposed a row of balls. The outer ring has an outer surface in form of a sphere portion, and in a similar manner the housing of the support has an inner surface in form of a sphere portion which is complementary with the one of the bearing, thereby forming a spherical bearing. A sensor is fixed to the support integral with the outer ring of the bearing, while a target is fixed to the inner ring of the bearing. In case of relative tilt between the rings of the bearing, there is a risk that the target impinges on the outer ring.

SUMMARY OF THE INVENTION

The purpose of the present invention is to provide an improved self-adjusting instrumented bearing.

To this end, the invention relates to a self-aligning instrumented rolling bearing comprising: an outer ring and an inner ring delimiting a rolling chamber in which is disposed at least one row of rolling elements; and a detection device including a sensor integral with or secured to the outer ring and a target integral with or secured to the inner race, configured to detect a relative rotation between the outer ring and the inner ring around a central axis. The bearing is characterized in that the outer ring has an inner surface in form of a spherical portion centered on a tilting center of the bearing and forming a rolling surface for the rolling elements; and in that the radius of the inner surface of the outer ring is greater than a distance defined between the tilting center of the bearing and a specific position of the target which is the farthest from the tilting center.

Thus, the invention ensures that the target does not hit the outer ring in the event of relative tilting between the bearing rings.

According to other advantageous features of the invention, taken alone or in combination:

A distance defined between the tilting center and a proximal position of the sensor which is the closest to the tilting center is greater than the distance defined between the tilting center and the specific position of the target. Thus, it is ensured that the sensor does not collide with the target in case of relative tilting or inclination between the bearing rings. Generally, this characteristic is intrinsic to the configuration of the detection device, in particular the shape and arrangement of the target and the sensor.

The specific position corresponds to an outer edge of the target.

The target has an outer surface in form of a sphere portion including the specific position.

The target has an inner surface in form of a sphere portion centered on the tilting center, the distance defined between the tilting center and the specific position corresponds to the radius of the outer surface of the target, and an air gap defined between the sensor and the target is constant irrespective of the tilting of the bearing about its tilting center.

The sensor comprises an inner surface in the form of a spherical portion.

The sensor is fixed to a side wall of the outer ring or the inner ring.

The bearing comprises two rows of rolling elements.

The bearing is a self-aligning ball bearing or a spherical roller bearing. The invention also relates to a mechanical system, equipped with a bearing as mentioned above.

BRIEF DESCRIPTION OF THE DRAWINGS

The invention will be better understood from reading the description which follows, given by way of example and with reference to the accompanying drawings, wherein.

DETAILED DESCRIPTION OF THE INVENTION

Figure 1:
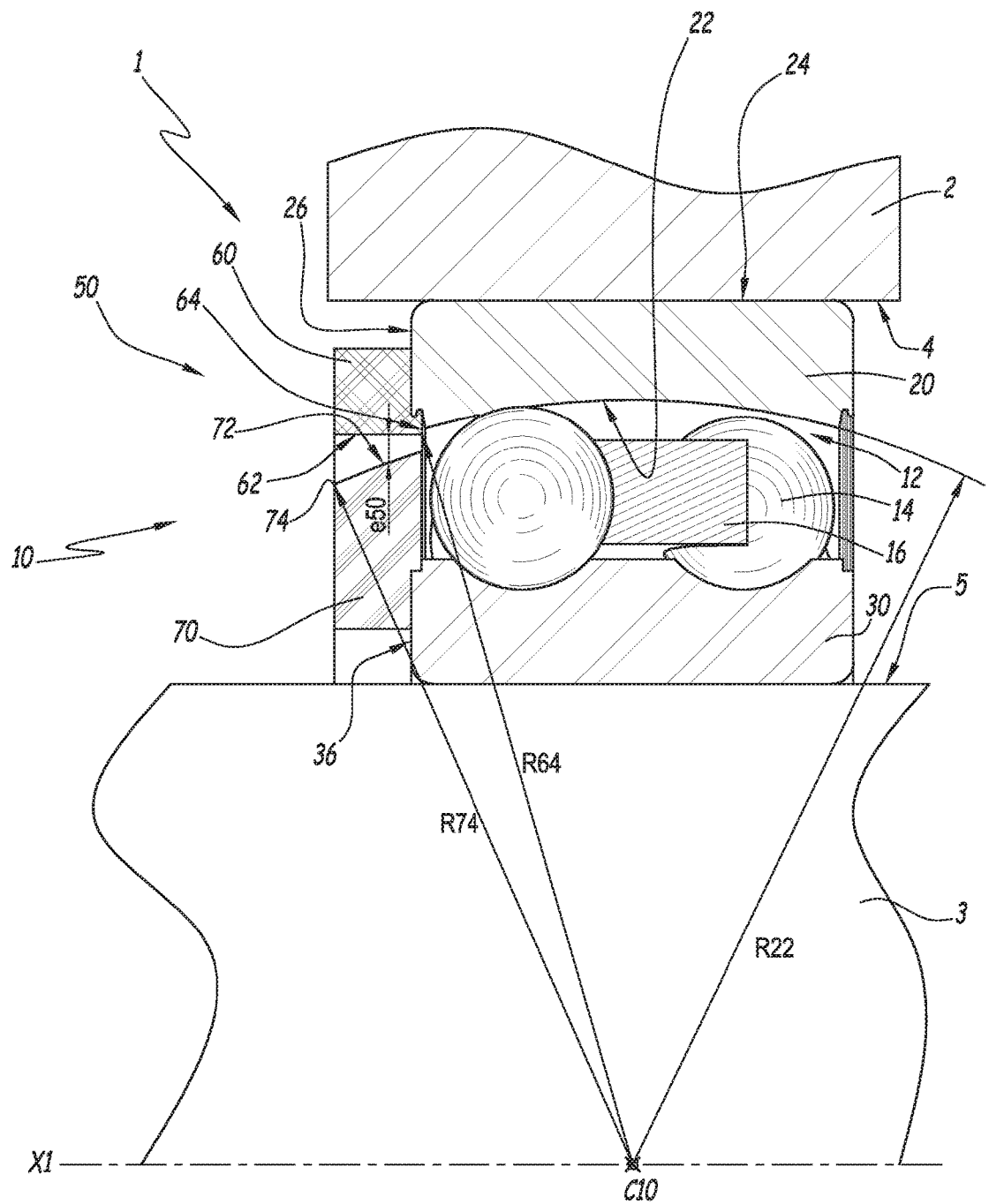
FIG. 1 is a partial sectional view of a mechanical system according to the invention, equipped with a bearing also according to the invention.

FIG. 1 shows partially a mechanical system 1 according to the invention. The system 1 comprises a support 2, a shaft 3 and a bearing 10 also according to the invention. The support 2 comprises a cylindrical bore 4, while the shaft has a cylindrical outer surface 5. The support 2 is fixed, while the shaft 3 is rotatable. When the support 2 and the shaft 3 are aligned, the bore 4 and the surface 5 are both centered on a central axis X1 of the mechanical system 1.

The bearing 10 comprises an outer ring 20 and an inner ring 30 defining a rolling chamber 12. Two rows of rolling elements 14 held by a cage 16 are disposed in the rolling chamber 12. More specifically, the rolling elements 14 are balls. The ring 20 is fixed in the bore 4 of the support 2, while the ring 30 is fixed on the surface 5 of the shaft 3.

The outer ring 20 has an inner surface 22 forming a rolling surface for the rolling elements 14 and a cylindrical outer surface 24 fitted in the bore 4. The surface 22 is in the form of a spherical portion centered on a tilting center C10 of the bearing 10, which is disposed on the central axis X1 of the system 1. The surface 22 has a radius R 22 around the center C10.

The bearing 10 is self-adjusting, that is to say that the rings 20 and 30 are pivotable relative to one another about the tilting center C10. For the targeted applications, this pivoting is generally limited to ±1.5 degrees. The bearing 10 thus allows compensating for any misalignment between the axis of the shaft 3 and the axis of the bore 4 formed in the support 2.

The bearing 10 also includes a detection device 50 including a sensor 60 and a target 70 configured to detect a relative rotation between the rings 20 and 30 around the central axis X1. The sensor 60 is fixed to a side wall 26 of the outer ring 20, while the target 70 is mounted on a side wall 36 of the inner ring 30. The sensor 60 has an inner surface 62 disposed opposite an outer surface 72 of the target 70, so that the sensor 60 may read the internal surface 72 of the target 70. A measuring gap, called air gap e50, is provided between the surfaces 62 and 72.

The sensor 60 has an inner edge 64 corresponding to the position of the surface 62 the closest to the center C10. We denote R64 the distance between the center C10 and the edge 64. For its part, the target 70 has an outer edge 74 corresponding to the position of the surface 72 the farthest from the center C10. We denote R74 the distance between the center C10 and the edge 74.

As the bearing 10 is self-adjusting, relative movement between the rings 20 and 30 causes relative movement between the sensor 60 and the target 70. In these conditions, one seeks to prevent the target 70 and specifically the edge 74 from hitting the sensor 60 or the ring 20. To this end, the bearing 10 is configured so that the distance R74 is smaller than radius R22 and distance R64.

Figure 2:
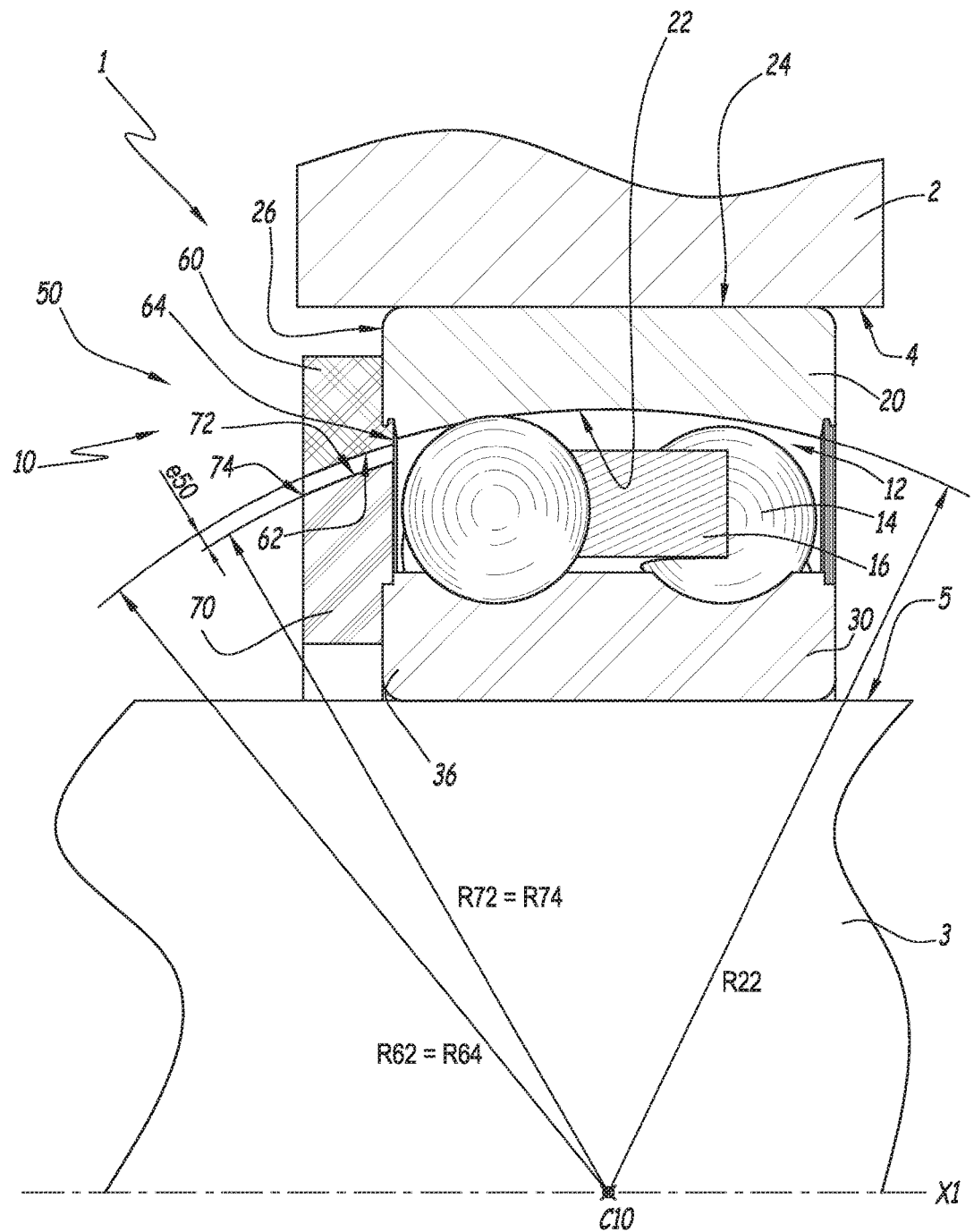
FIG. 2 is a section similar to FIG. 1 showing a rolling bearing according to a second embodiment of the invention.

FIG. 2 shows a bearing 10 according to a second embodiment of the invention, equipping the mechanical system 1. For simplification purpose, the elements of the bearing 10 similar to those of the first embodiment bear the same reference numerals. Only the differences with the first embodiment are detailed below. In this second embodiment, the outer surface 62 of sensor 60 has a spherical portion including the edge 64. Therefore, the distance R64 defined between the tilting center C10 and the edge 64 corresponds to the radius R62 of the outer surface 62 of the sensor 60. More precisely, the surface 62 is in the form of a spherical portion centered on the center C10 of the bearing 10.

In addition, the outer surface 72 of the target 70 is in the form of a spherical portion. Thus, the air gap e50 defined between the target 70 and the sensor 60 is constant irrespective of the inclination of the bearing 10 around the center C10 in the angular range of ±1.5 degrees. More specifically, the surface 72 is in the form of a spherical portion centered on the center C10. Thus, the gap e50 defined between the sensor 60 and the target 70 is constant irrespective of the inclination or tilting of bearing 10 around the center C10.

Furthermore, the mechanical system 1 may be shaped differently from FIGS. 1 and 2 without departing from the scope of the invention. In particular, the bearing 10 may have any configuration suitable for the intended application.

In a variant not shown, the sensor 60 can be attached directly to the support 2 or on an additional member integral with the ring 20 and the support 2.

Whatever the embodiment, the outer ring 20 of the bearing 10 has an inner surface 22 in the form of a sphere portion centered on the tilting center C10 of the bearing and forming a rolling surface for the rolling elements 14. The radius R22 of the inner surface 22 is greater than a distance defined between the center C10 and a specific position 74 of the target 70 which is the farthest from the center C10.

The two embodiments described above correspond to a Self-Aligning Ball Bearing. The invention can also be implemented on other types of bearings, in particular a Spherical Roller Bearing 10.

Figure 3:
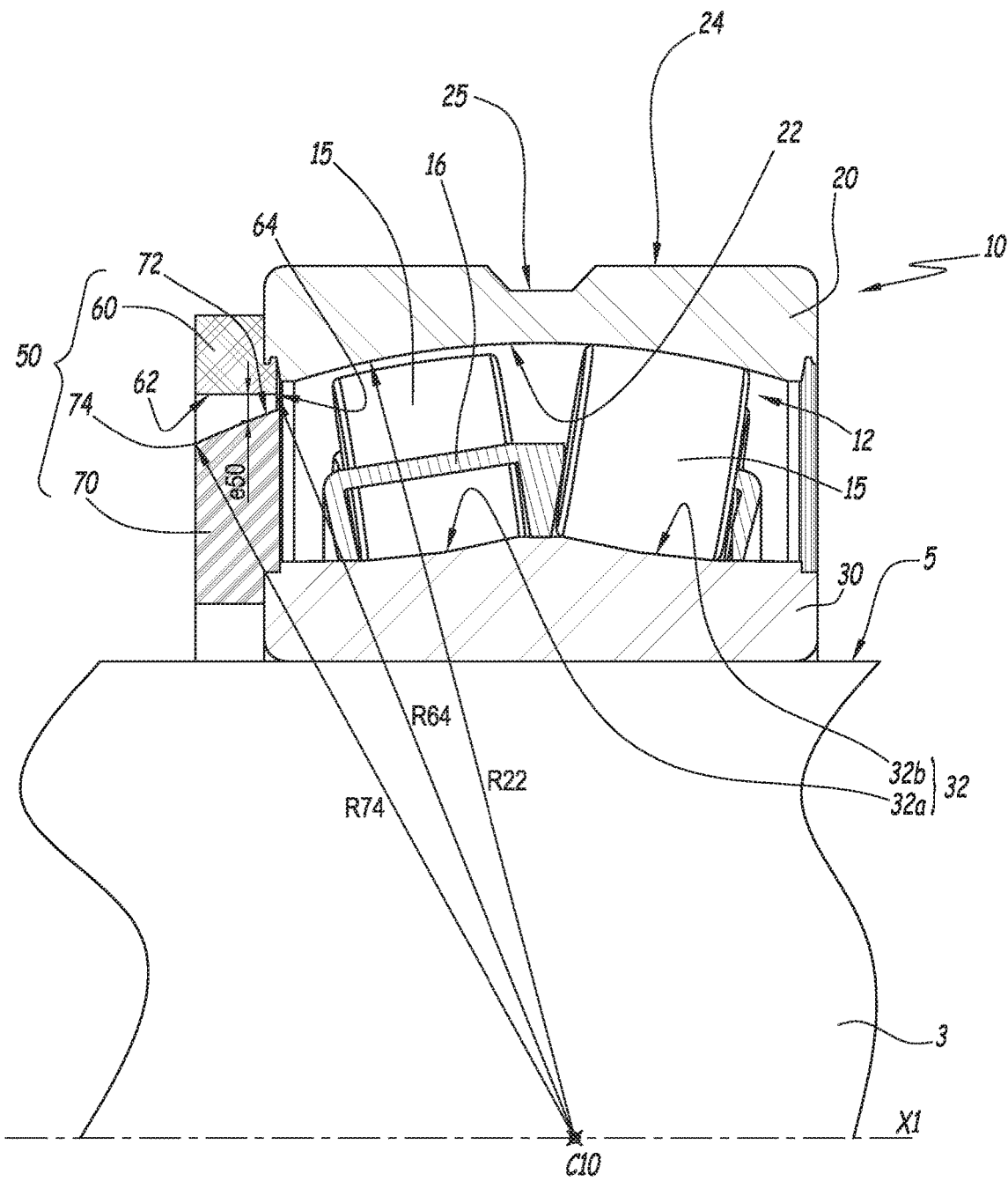
FIG. 3 is a section similar to FIGS. 1 and 2 showing a bearing according to a third embodiment of the invention.

Such a bearing 10 is shown in FIG. 3 and constitutes a third embodiment of the invention. In a simplification, the components of this bearing 10 that are comparable to those of the first embodiment bear the same reference numbers. Only the differences from the previous embodiments are mentioned below, for brevity's sake. The bearing 10 of FIG. 3 has an outer ring 20 having an inner surface 22 in the form of a spherical portion centered on a tilting center C10 of the bearing and forming a rolling surface for the rollers 15. In the example, the bearing 10 has two rows of spherical rollers 15 arranged side by side. The spherical rollers 15 each have a peripheral surface, or a rolling surface, in the form of a spherical portion. The inner ring 30 has an outer surface 32 which is formed by two surface portions 32a and 32b. Portions 32a and 32b form a rolling surface for each row of rollers 15. In the section plane of FIG. 3, the surfaces 32a and 32b have a curved shape, the concavity of which is opposite from that of the surface 22. The center of curvature of the surface 32a is instead arranged on the side of the detection device 50, while the center of curvature of the surface 32b is disposed on the opposite side.

Surfaces 32a, 32b and 22 have substantially the same radius of curvature. This radius of curvature is also the same as that of the peripheral surface of the spherical rollers 15. Furthermore, the outer surface 24 of the outer ring 20 defines a circumferential groove 25.

In the example shown in FIG. 3, the detection device 50 is substantially the same as used in FIG. 1. More specifically, detecting device 50 comprises a sensor 60 secured to the outer ring 20 and a target 70 fixed of the inner ring 30 configured for detecting a relative rotation between the outer ring (20) and the inner ring 30 around a central axis X1. As in the first embodiment, the sensor 60 includes an inner surface 62 which is cylindrical and centered on axis X1.

The technical characteristics of the different embodiments and the above variations may be all or for some of them combined. In particular, the detection device 50 of FIG. 2 may be integrated with a spherical roller bearing as shown in FIG. 3. Thus, the mechanical system 1 and the bearing 10 can be adapted in terms of cost, functionality and performance.

The invention claimed is:
1. A self-aligning instrumented bearing comprising:
an outer ring,
an inner ring delimiting a rolling chamber having at least one row of rolling elements disposed therein; and
a detection device including a sensor integral with the outer ring and a target integral with the inner ring configured to detect a relative rotation between the outer ring and the inner ring around a central axis; wherein
the outer ring has an inner surface in the form of a first spherical portion centered about a tilting center of the bearing and having a first radius with respect to the tilting center, the inner surface of the outer ring forming a rolling surface for the rolling elements; and wherein the sensor having a sensor inner surface in the form of a second spherical portion centered on the tilting center and having a second radius with respect to the tilting center, the target having a target outer surface in the form of a third spherical portion centered on the tilting center and having a third radius with respect to the tilting center, wherein the first radius of the inner surface of the outer ring is greater than the second radius of the sensor inner surface, and, the second radius of the sensor inner surface is greater than the third radius of the target outer surface such that the first radius of the inner surface of the outer ring is greater than a distance between the tilting center of the bearing and a specific position of the target that is farthest from the tilting center.

2. The self-aligning instrumented bearing according to claim 1, wherein a distance defined between the tilting center and a proximal position of the sensor that is the closest to the tilting center is greater than the distance defined between the tilting center and the specific position of the target.

3. The self-aligning instrumented bearing according to claim 1, wherein the distance defined between the tilting center and the specific position corresponds to the third radius of the target outer surface, and an air gap defined between the sensor and the target is constant regardless of the tilting of the bearing about its tilting center.

4. The self-aligning instrumented bearing according to claim 1, wherein the sensor is fixed to a side wall of one of the outer ring and the inner ring.

5. The self-aligning instrumented bearing according to claim 1, further comprising two rows of rolling elements.

6. The self-aligning instrumented bearing according to claim 5, wherein the bearing further comprises a Self-Aligning Ball Bearing or a Spherical Roller Bearing.

7. A mechanical system equipped with a bearing, the bearing comprising:
an outer ring,
an inner ring delimiting a rolling chamber having at least one row of rolling elements disposed therein; and
a detection device including a sensor integral with the outer ring and a target integral with the inner ring configured to detect a relative rotation between the outer ring and the inner ring around a central axis; wherein
the outer ring has an inner surface in the form of a first spherical portion centered about a tilting center of the bearing and having a first radius with respect to the tilting center, the inner surface of the outer ring forming a rolling surface for the rolling elements; and wherein
the sensor having a sensor inner surface in the form of a second spherical portion centered on the tilting center and having a second radius with respect to the tilting center, the target having a target outer surface in the form of a third spherical portion centered on the tilting center and having a third radius with respect to the tilting center, wherein the first radius of the inner surface of the outer ring is greater than the second radius of the sensor inner surface, and, the second radius of the sensor inner surface is greater than the third radius of the target outer surface such that the first radius of the inner surface of the outer ring is greater than a distance between the tilting center of the bearing and a specific position of the target that is farthest from the tilting center.

\* \* \* \* \*